(No Model.)
A. WANNER, Jr.
METAL FRAMED TRIPLE MIRROR.
No. 538,091. Patented Apr. 23, 1895.
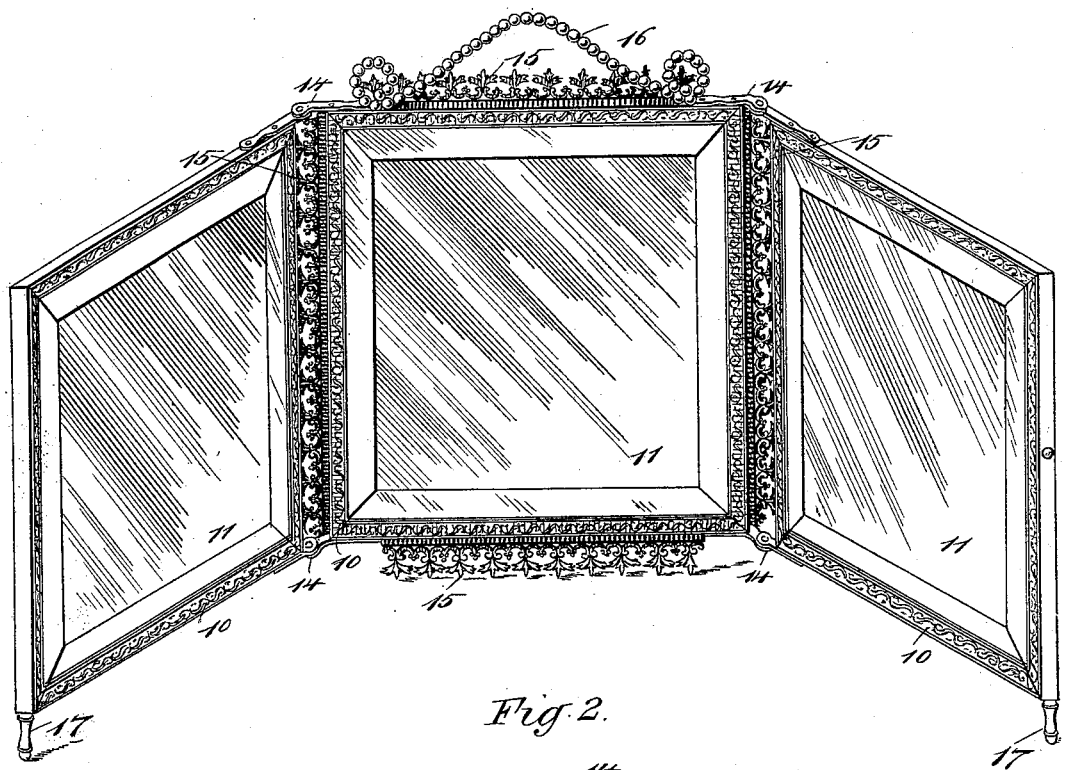
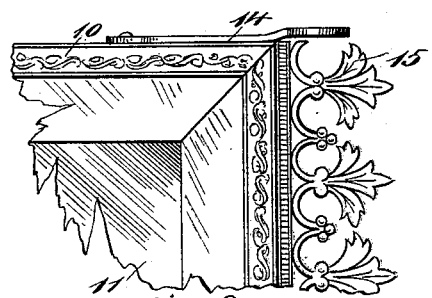
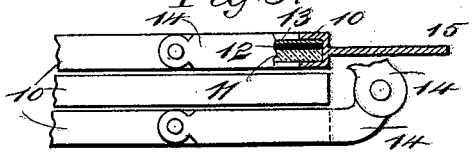
WITNESSES:
INVENTOR
BY
ATTORNEYS.

UNITED STATES PATENT OFFICE.

ALBERT WANNER, JR., OF HOBOKEN, NEW JERSEY.

METAL-FRAMED TRIPLE MIRROR.

SPECIFICATION forming part of Letters Patent No. 538,091, dated April 23, 1895.

Application filed March 27, 1894. Serial No. 505,273. (No model.)

*To all whom it may concern:*

Be it known that I, ALBERT WANNER, Jr., of Hoboken, in the county of Hudson and State of New Jersey, have invented a new and useful Improvement in Metal-Framed Triple Mirrors, of which the following is a full, clear, and exact description.

My invention relates to improvements in metal framed triple mirrors, of a class provided for toilet uses, these devices being adapted by their arrangement, when in open adjustment, to enable the user to see the sides and rear portion of the head as well as the face, whereby the arrangement of the hair and applied ornaments may be conveniently inspected, by the observer looking in the center glass.

In order to avoid excessive weight, the rectangular frames of triple mirrors are usually formed of light sheet metal, struck into shape by proper dies, the three similar frames being hinged together at adjacent side edges, thus leaving an objectionable gap between the mirrors when they are in opened adjustment.
It has been found that the heavy plate glass mirrors when framed as stated, by their weight strain the hinges and parts of the frame to which the latter are attached, so that the three sections will not correctly fold, nor all stand in a vertical position when so strained.

To remedy the defects mentioned, which is incidental to the usual method of constructing triple mirrors, and thereby strengthen as well as close the gaps between the mirrors, is the object of my present invention, and it consists in the peculiar construction and combination of parts, as is hereinafter described and indicated in the claim.

Reference is to be had to the accompanying drawings, forming a part of this specification, in which similar figures of reference indicate corresponding parts in all the views.

Figure 1 is a perspective front view of a triple mirror having the improvement. Fig. 2 is a detached and enlarged view of a corner portion of the center section of the triple mirror; and Fig. 3 is a plan view in part, of the three sections of the mirror at corners, folded, and one outer part broken and in section, showing the construction of the frame and contained parts.

As represented in Fig. 1, the three mirror sections are of a rectangular shape, each having a light sheet metal frame 10 that is clearly shown in Fig. 3. The mirrors proper, are each indicated by the integer 11, and are of a similar form, preferably consisting of moderately heavy plate glass sheets that are marginally rectangular, and beveled on the outer surface along the edges, being silvered as usual on their reverse sides.

The light border frames 10, are pressed into form from thin sheet metal strips of a suitable breadth and length, these being given a rectangular form of such proportionate dimensions, as will adapt them to receive the mirror plates in recesses that are produced by bending two parallel side-walls on each frame strip.

To introduce the mirror plates 11 within the marginal recesses of the frames 10, the side walls of the frames at the rear are sufficiently raised from a level plane to admit their insertion, and along with each mirror plate a slightly pliable backing piece 12 is introduced, which is imposed on the silvered surface of each mirror plate, and serves to prevent abrasion of the coated surface of the mirror plates, more rigid outer back plates 13 being placed flat on the pieces 12, as indicated by the sectional portion of Fig. 3.

The three parts 11, 12, 13 of each mirror section, are secured in place in the order mentioned, by rendering the side walls of each frame parallel, and in some cases it may be advisable to neatly solder the joints of the frame.

The hinges 14 are each composed of two flat leaves of a suitable length, which are secured on the top and bottom edges of the frames 10, so that a sufficient portion of the leaves will project beyond the side edges of the frames, these outer ends being bent edgewise toward each other in pairs that are lapped and pivoted together, as indicated in Fig. 3, the degree of curvature for these pivoted hinge leaves being so proportioned, that the mirror section at one side will be permitted to lie flat on the center mirror frame, and the other side section of the mirror be adapted to fold flat on the first mentioned side section. This construction of the hinge joints between the mirror sections has the advantage of extreme simplicity and cheapness, and should either of the leaves become bent or broken, it may readily be repaired or replaced by a new one without lessening the strength of the structure. Moreover, by curving the leaves of the hinge joints between the central section and the respective exterior sections to different degrees, the space between the edges of the sections is maintained equal at all times, and this is accomplished with the aid of but one pair of hinges. I am aware that a double-hinge joint has been employed to accomplish this purpose but such a construction is inherently weak. To hide the spaces between the mirror sections, the opposite sides of the central section are each provided with a projecting wing plate 15, soldered or brazed thereto, as seen in the drawings.

The wing plates 15, may be formed imperforate, but preferably they are produced in the ornamental style indicated, imitating a lace-work design, that renders the wings light and affords ornamentation to the frame, serving to close up the gap between the side edges of the mirror sections where they are necessarily separated an unequal degree, to permit them to be folded one on the other as has been explained; this being very desirable, as it greatly adds to the appearance of the opened mirrors, as they are thus rendered apparently continuous.

To further stiffen the frame of the center mirror section, similar wings 15, are secured on the top and lower edges of said frame, and an ornamental arch piece 16, is preferably affixed by its scrolled ends on the upper edge of the center frame, which greatly adds to the beauty of the design, and is useful as a handle for the portage of the triple mirror when it is in a folded condition.

The wing 15 secured to the under side of the central mirror section forms a base or foot to support said section slightly above its supporting surface, and in order that the exterior mirror sections may also be supported at a similar elevation, I provide each of said sections with a foot post 17, projecting downward from its outer portion as clearly seen in Fig. 1. Thus it will be seen that each of the mirror sections is provided with one support only, whereby should the hinges between the sections become bent or loosened in any way, said sections will still be supported in an erect position upon their supporting surface. The wing plate 15 has the further advantage that when soldered or brazed on the sides or edges of the central mirror frame, it will serve to close the joint in the sheet metal of which said frame is composed, and to prevent the same from opening when strained. Said wing plate 15 also forms at the opposite sides of the central mirror section, stops against which bear the adjacent edges of the exterior mirror sections, whereby the same are limited in their backward movement as will be readily understood. Further, as said wing plates are usually of very delicate metal work, as indicated in the drawings, their arrangement along the entire length of the sides of the central mirror section prevents them from being bent or broken by the strain of impact with the edges of the exterior section.

Having thus fully described my invention, I claim as new and desire to secure by Letters Patent—

A mirror composed of three sections, each having a frame made from a strip of sheet metal bent to form, a curved hinge leaf secured to the upper and lower side of each exterior section and projecting beyond one side of the same in the plane of the sides to which they are secured, two curved hinge-leaves similarly secured to the upper and lower sides of the central section and projecting from the lateral edges thereof in the planes of the sides to which they are secured, the leaves on the adjacent edges of the sections being pivoted together to form hinges and the curvature of the leaves of one set of said hinges being greater than that of the other set, whereby said exterior sections may be compactly folded down on the central section one over the other, a downwardly projecting wing on the central section adapted to support said section above its supporting surface, and depending legs at the outer lower corners of the outer sections, the inner ends of said outer sections being supported solely by their connection with the central section substantially as set forth.

ALBERT WANNER, Jr.

Witnesses:
C. SEDGWICK,
F. W. HANAFORD.